(12) United States Patent
Tran et al.

(10) Patent No.: US 10,704,155 B2
(45) Date of Patent: Jul. 7, 2020

(54) LOW HYDROGEN EMBRITTLEMENT ZINC/NICKEL PLATING FOR HIGH STRENGTH STEELS

(71) Applicant: THE BOEING COMPANY, Chicago, IL (US)

(72) Inventors: Luong M. Tran, Tacoma, WA (US); Matthias P. Schriever, Auburn, WA (US); John H. Jones, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 154 days.

(21) Appl. No.: 15/424,392

(22) Filed: Feb. 3, 2017

(65) Prior Publication Data

US 2017/0211198 A1    Jul. 27, 2017

Related U.S. Application Data

(63) Continuation of application No. 13/242,806, filed on Sep. 23, 2011, which is a continuation of application No. 11/963,283, filed on Dec. 21, 2007, now Pat. No. 8,048,285, which is a continuation-in-part of application No. 11/126,645, filed on May 11, 2005.

(51) Int. Cl.

| C25D 5/36 | (2006.01) |
|---|---|
| C22C 18/00 | (2006.01) |
| C25D 3/56 | (2006.01) |
| C25D 7/00 | (2006.01) |
| B32B 15/01 | (2006.01) |

(52) U.S. Cl.
CPC ............ *C25D 3/565* (2013.01); *B32B 15/015* (2013.01); *C22C 18/00* (2013.01); *C25D 5/36* (2013.01); *C25D 7/00* (2013.01); *Y10T 428/12479* (2015.01); *Y10T 428/12792* (2015.01); *Y10T 428/12799* (2015.01); *Y10T 428/30* (2015.01)

(58) Field of Classification Search
None
See application file for complete search history.

(56) References Cited

U.S. PATENT DOCUMENTS

| 3,691,027 A | 9/1972 | Hartford et al. |
|---|---|---|
| 3,972,789 A | 8/1976 | Eppensteiner et al. |
| 4,765,871 A | 8/1988 | Hsu et al. |
| 4,877,496 A | 10/1989 | Yanagawa et al. |
| 4,889,602 A | 12/1989 | Oshima et al. |

(Continued)

OTHER PUBLICATIONS

Atotech, "Zinc Alloys, Data Sheet, Reflectalloy® ZN-HD", Atotech UK Ltd., pp. 1-8, Apr. 23, 2003.

(Continued)

*Primary Examiner* — Adam Krupicka
(74) *Attorney, Agent, or Firm* — Patterson + Sheridan, LLP (57) ABSTRACT

The invention provides a method for producing a corrosion-resistant article, where the article is conductive and subject to hydrogen uptake during electroplating of a coating. The method comprises electroplating a zinc/nickel coating on the article in an aqueous, basic plating solution containing zinc and nickel ions. The method uses an electrolyte in the form of a soluble hydroxide salt with the weight ratio of zinc ions to nickel ions in the solution being sufficient to provide the coating comprising from about 85% to about 95% by weight zinc, and about 5% to about 15% by weight nickel. The plating solution is substantially free of brightening agents which retard hydrogen bake-out.

21 Claims, 6 Drawing Sheets

(56) References Cited

U.S. PATENT DOCUMENTS

| | | |
|---|---|---|
| 5,417,840 A | 5/1995 | Block et al. |
| 2004/0163740 A1 | 8/2004 | Keener et al. |
| 2005/0133376 A1 | 6/2005 | Opaskar et al. |

OTHER PUBLICATIONS

Atotech Product Literature, Reflectalloy® ZNA, Alkaline Zinc-Nickel Plating Process, revised Apr. 29, 2003, pp. 1-17.

Atotech Product Literature, Reflectalloy ZNA, revised Dec. 9, 2004, 5 pages.

Atotech, "Zinc Alloys, Analytical Instruction, Determination of Zinc in Reflectalloy ZN-HD by Titration", Atotech UK Ltd., pp. 9-10, May 26, 2002.

Evans, The effect of Nickel Plating on Hydrogen Embrittlement of High Strength Steel, Cranfield Institute of Technology, School of Industrial and Manufacturing Science, Jul. 1992.

Atotech, "Zinc Alloys, Analytical Instruction, Reflectalloy ZN-HD Carrier in LCD & HCD in Relectalloy ZN-HD—Titrimetrically", Atotech UK Ltd., pp. 17-18, Jun. 26, 2002.

Atotech, "Zinc Alloys, Analytical Instruction, Determination of Zinc by AAS in Reflectalloy ZN-HD", Atotech UK Ltd., pp. 11-12, Jun. 26, 2002.

Atotech, "Zinc Alloys, Analytical Instruction, Determination of Nickel by AAS in Reflectalloy ZN-HD", Atotech UK Ltd., pp. 13-14, Jun. 26, 2002.

Atotech, "Zinc Alloys, Analytical Instruction, Determination of Caustic Soda in Reflectalloy ZN-HD", Atotech UK Ltd., pp. 15-16, May 26, 2002.

LOW HYDROGEN EMBRITTLEMENT ZINC/NICKEL PLATING FOR HIGH STRENGTH STEELS

CROSS-REFERENCE TO RELATED APPLICATIONS

This application is a continuation of U.S. patent application Ser. No. 13/242,806, filed on Sep. 23, 2011, which is a continuation of U.S. patent application Ser. No. 11/963,283 filed on Dec. 21, 2007; which is a continuation-in-part of U.S. patent application Ser. No. 11/126,645 filed on May 11, 2005. The disclosure of the above application is incorporated herein by reference.

FIELD

The present invention relates to electroplating an article with a zinc/nickel alloy and to zinc/nickel electroplated articles made of low alloy high strength steel exhibiting corrosion resistance and low hydrogen embrittlement.

BACKGROUND

High strength steels are employed on commercial aircraft components such as landing gears, flap tracks and other high load items. Conventionally, special purpose coatings such as chrome deposits for wear or cadmium deposits for corrosion protection are deposited electrolytically from aqueous electroplating baths. Electroplating tends to liberate hydrogen from the cathode, which can lead to hydrogen embrittlement unless removed through controlled baking after plating.

High-strength low alloy steels are sensitive to delayed, brittle failures at certain low stresses. Such failures have been attributed to the presence of hydrogen in the steel microstructure. The hydrogen can be introduced into the microstructure by reaction with water or aqueous solution, or, by electrochemically discharging hydrogen at the surface of the steel. Since high-strength steels have corrosion-resistant coatings that are applied by electroplating techniques, hydrogen is discharged onto the steel surface along with the corrosion-resistant coating. Therefore, the quantity of hydrogen deposited at the coating steel interface must be carefully monitored and controlled.

In order to bake out hydrogen from these steels, a plate deposit of specific structure and morphology is required in order to allow the hydrogen to pass through the plating. For this purpose the aircraft industry and others have used low embrittlement processes such as BAC5709, "Hard Chromium Plating" and BAC5804, "Low Hydrogen Embrittlement Cadmium-Titanium Alloy Plating".

Cadmium-titanium electroplating of high strength low alloy steels provides suitable resistance to hydrogen embrittlement. A Cd—Ti alloy is electroplated onto high-strength steels under carefully controlled conditions. The resulting plated product is then heat treated at elevated temperatures to achieve an acceptable low hydrogen embrittlement level. It is believed that the porosity of the electroplated cadmium-titanium alloy is the key to the removal of the hydrogen during a subsequent heat treatment operation. It must be noted that the cadmium-titanium plating bath is sensitive to contamination, so care must be taken to achieve acceptable embrittlement characteristics. And toxic components in the bath lead to health and environmental problems. For example, the cadmium-titanium alloy plating bath contains cadmium and cyanide, which create disposal problems unless expensive waste treatment equipment is employed.

Zinc/nickel alloys have been suggested for electroplating onto steels to render them corrosion-resistant. Such zinc/nickel baths are free of cadmium and cyanide free and contain relatively non-toxic components. Some have provided acceptable corrosion protection, but most have disadvantages such as difficulty in controlling the process, and unacceptably short bath life.

There continues to be a need for an improved coated product having corrosion resistance, low hydrogen embrittlement and which is non-toxic, especially as it relates to high strength low alloy steels for the aerospace industry.

SUMMARY

In summary, in the past, there was an attempt to achieve corrosion protection of high strength steels while avoiding hydrogen embrittlement through cadmium plating. Cadmium is a known carcinogen and air pollutant. The process also uses cyanide and special precautions are needed to avoid releasing this as a harmful gas. An acid zinc/nickel plating process that is used for lower strength steels poses problems with hydrogen embrittlement, particularly for higher strength steels.

Drawbacks of the prior process are avoided and advantages obtained through the practice of a method for producing a corrosion-resistant article. The article is especially selected from high strength low alloy steels such as are used for high strength parts in the aerospace industry. The method comprises electroplating a zinc/nickel coating on the article from an alkaline plating bath. The method uses an electrolyte in the form of a soluble hydroxide salt with the weight ratio of zinc ions to nickel ions in the solution being sufficient to provide the coating 10 comprising from about 85% to about 95% by weight zinc, and about 5% to about 15% by weight nickel. In an innovation, the plating solution is maintained substantially free of organic materials that interfere with formation of a plating resistant both to corrosion and to hydrogen embrittlement. It has been discovered that such interfering materials include many that serve as conventional "brighteners" for plating of other alloys.

In certain embodiments, the plating solution contains no organic materials at all. In other embodiments, the plating solution contains an organic material that acts as a nickel complexing agent without interfering with plating a resistant coating.

By using the plating baths, for the first time so-called "dense, porous" plating or coating can be applied on high strength low alloy steels that provide resistance both to general corrosion and to hydrogen embrittlement. Corrosion protection is provided by the dense nature of the coating. Favorable hydrogen embrittlement properties are provided by the porous nature of the coating. The release of previously-absorbed hydrogen is achieved by various methods whereby hydrogen diffuses within the material and is outgassed from the material. The release of hydrogen via bake-out occurs typically at elevated temperature over a period of time.

Thus, in various embodiments, plated articles are provided that have a high strength low alloy steel substrate and a Zn/Ni plated coating in a dense, porous morphology that provides an desirable combination of corrosion resistance and low hydrogen embrittlement.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION OF THE PREFERRED EMBODIMENTS

The following description of the preferred embodiment(s) is merely exemplary in nature and is in no way intended to limit the invention, its application, or uses.

In one embodiment, a method is provided for producing a plated low alloy high strength steel that has superior corrosion and low hydrogen embrittlement properties. The method involves electroplating a zinc/nickel coating on a low alloy high strength steel substrate from an alkaline plating bath. The plating bath contains zinc and nickel at a level that will produce a plated coating containing 85-95% by weight zinc and 5-15% by weight nickel. Preferably, the bath contains an effective amount of a nickel complexing agent. In a preferred embodiment, the bath contains essentially no components that are a brightener for zinc, nickel, electroplated coatings. In particular, the bath preferably contains less than 100 ppm, and preferably less than 10 ppm or less than 1 ppm of any organic material other than the complexing agent. Advantageously, the coating applied by such a method has a dense, porous morphology that provides corrosion resistance on account of its density and resistance to hydrogen embrittlement on account of its porosity.

In various embodiments, the alkaline electroplating bath has a pH of 12-13.5 and contains the zinc, nickel, and complexing agent described above. Generally, it is preferred to control the process by using suitable levels of hydroxide as discussed herein. Depending on a number of factors, including the buffering capacity of the bath a pH of 12-13.5 is achieved.

In one aspect, the invention is based on the discovery that a high performance zinc nickel coating can be plated by using optimized parameters that, because of the lack of any organic material other than the complexing agent, lead to coatings on low alloy high strength steels that have a combination of corrosion and hydrogen embrittlement properties. Thus in various embodiments, the hydroxide concentration of a bath is held 17.4-21.2 ounces per gallon (normally resulting in a pH of 12-13.5) and the cathode current density during electroplating is 30-60 amperes per square foot. Other preferred parameters for the electroplating include a bath temperature of 70° F.-80° F., a content of zinc metal ranging from 1.17-1.45 ounces per gallon, a composition of nickel metal in the bath ranging from 0.12-0.15 ounces per gallon, and the weight ratio of zinc to nickel in the bath ranging from 10:1 to 11:1. In a preferred embodiment, all of the bath and coating parameters mentioned above are combined. It has been determined that, by leaving out conventional brightening agents, coatings of suitable morphology and corrosion and embrittlement characteristics can be produced on high strength low alloy steels.

In another embodiment, the invention provides a method or protocol for preparing a low alloy high strength part for electroplating, followed by electroplating and hydrogen embrittlement relief baking the electroplated part. Thus, in one embodiment, the invention provides a method comprising an aqueous degreasing of the steel part, followed by grit blasting the degreased part. Thereafter, the grit blasted steel part is activated before electroplating it in an alkaline Zn/Ni plating bath. After electroplating, the part is subjected to a relief baking to remove hydrogen and improve hydrogen embrittlement. Optionally and preferably, a chromate conversion coat is applied onto the relief baked part. Electroplating is carried out under the conditions and parameters described herein.

An advantage of the methods is that it provides zinc/nickel plated steel parts that combine corrosion resistance and low hydrogen embrittlement. In various embodiments, the useful combination of properties is ascribable to a dense and porous morphology of the plating that forms on the part during the electroplating step and subsequent bake out.

Thus, in one embodiment, the invention provides a zinc nickel plated article made of a substrate and a zinc/nickel alloy plating on the substrate. In particular embodiments, the substrate is a high strength low alloy steel and the plating contains 85-95% by weight zinc and 5-15% weight nickel. As noted, the morphology of the plating is dense and porous, such that the article meets corrosion specification requirements when tested in accordance with ASTM B-117 and the low embrittlement specification requirements when tested in accordance with ASTM F-519, Type 1a.2. In preferred embodiments, the substrate is a steel alloy such as AISI 4340M, and/or the article is part of a commercial air craft component. The plated article is made, in preferred embodiments, by any of the methods described herein. As noted, the plating on the substrate is characterized by a morphology sufficiently dense to provide the observed corrosion resistance and adequately to provide egress channels to meet the porous low hydrogen embrittlement characteristics. That is, the plating has a density sufficient to provide corrosion resistance and a porosity sufficient to provide hydrogen embrittlement resistance.

In various embodiments, a zinc/nickel alloy is electrodeposited onto a variety of electrically conductive substrates in accordance with the present invention. The zinc/nickel alloy deposited in accordance with the present invention is especially efficacious, however, when applied to high-strength steel articles that are sensitive to hydrogen embrittlement. Not only is the steel article rendered corrosion resistant, it also exhibits little or no hydrogen embrittlement after the electroplating process. Accordingly, the present invention provides a viable and effective substitute for prior cadmium-titanium corrosion-resistant coatings.

High-strength steels are generally those steels having a tensile strength, as a result of alloys being heat-treated, of about 200 ksi or higher, and more particularly 220 ksi or higher. High strength low alloy steels (HSLA steel) is a term given to high strength steels that have a relatively low level of alloying, such as below 20% or at 10% or below. Typical alloying elements in HSLA steels include Cr and Ni. In one aspect, HSLA steels are distinguished from so-called stainless steels which, because of their relatively high content of alloying metals (for example Cr) are designated high alloy steels.

The alloy steels coated as described herein exhibit a favorable combination of corrosion resistance and hydrogen embrittlement resistance. In various embodiments, the plated high strength low alloy steels meet corrosion resistance requirements of ASTM B-117 and the low hydrogen embrittlement requirements of ASTM F-519, Type 1a.2

The invention is particularly advantageous to high strength low alloy steels having the stated tensile strength or higher. However, the invention is also useful for other steels and metals, such as copper, which are susceptible to hydrogen uptake during electro-deposition in a solution that liberates hydrogen. The invention is also useful in plating low strength steels such as AISI 4130, carbon steels, and stainless steels. The invention is also useful for coating other conductive substrates such as graphite. The invention is an alternative to acid zinc/nickel bath plating, and other plating baths containing agents that facilitate hydrogen embrittlement.

The plating bath formed in accordance with the present invention is an aqueous solution containing zinc, nickel, and an electrolyte in the form of a soluble hydroxide salt, preferably along with a nickel complexing agent. The metal cations are placed in an aqueous solution of a solubilized oxide or salt of the cation. It is preferred, as will be discussed in more detail below, that the solution contains hydroxide ions. Brighteners are not included in the solution.

The zinc cations can be provided by a variety of water-soluble zinc compounds. The water-soluble compounds include zinc hydroxide and other zinc salts such as zinc sulfate, zinc oxide and, of course, the various combinations and mixtures thereof. Zinc content is achieved and also replenished by a variety of means. Concentration of the zinc salt should be sufficient to provide at least about one ounce 10 of zinc ion per gallon of solution. Preferably, the zinc ions should be present in an amount ranging from about 1.1 to about 1.5 ounces per gallon of solution, and more preferably from about 1.17 to about 1.45 ounces per gallon. The concentrations are based on the weight of zinc. An appropriate amount of zinc salt is added to the bath to provide those concentration levels.

The nickel cations can be provided from a variety of water-soluble nickel salts, including nickel sulfate, nickel fluoroborate, nickel acetate, and the various mixtures and combinations thereof. Nickel sulfate is preferred. The nickel salt should be present in an amount sufficient to provide at least about 0.1 ounces of nickel ion per gallon of solution. It is preferably about 0.1 to about 0.2 of nickel ion, and more preferably about 0.12 to about 0.15, ounces per gallon. As with zinc, the concentration levels are based on the weight of nickel ion. Stoichiometric considerations determine how much nickel salt to add to the bath to provide these concentration levels.

In particular embodiments, and particularly when a preferred high strength low alloy steel is to be plated, it is preferred that the weight ratio of zinc ion to nickel ion in the solution be in the range of from 10:1 to 11:1. Such levels have been shown to provide a plated coating exhibiting advantageous combinations of corrosion resistance, low hydrogen embrittlement, and re-embrittlement characteristics.

The conductivity of the electroplating bath is increased by the presence of the electrolyte. The preferred electrolytes include soluble hydroxide salts of metals, preferably Group I alkali metals and most preferably, sodium hydroxide. Various mixtures and combinations of metal hydroxides may be used. The sodium hydroxide should be present in the bath in an amount sufficient to provide from about 15 to about 25 ounces of sodium hydroxide per gallon of solution, preferably from about 17.4 to about 21.2 ounces per gallon of solution. Naturally, the electrolytes provided by the metal hydroxides also increase the pH of the bath. If necessary, the pH can be adjusted with an acid such as sulfuric acid to achieve a desired value. In preferred embodiments, the pH of the electroplating bath is adjusted to a basic range, preferably pH greater than 12 and less than 14. An exemplary pH range is from about 12 to about 13.5.

Although the bath can contain agents to help keep the nickel ions in solutions, conventional brightening agents, such as organic brighteners, are not included in the solution. Conventional brighteners, and particularly organic brighteners are employed in the art to provide bright, specular deposits. However, in preferred embodiments the present invention avoids brighteners, and indeed any organic material except for the nickel complexing agents. By the present invention, it has been observed that the use of such brighteners in the electroplating bath tends to lead to plating deposits that are sufficiently dense to obtain good corrosion resistance, but insufficiently porous to provide favorable embrittlement properties, especially in the case of plated HSLA alloys. It is believed that the dense platings retard or otherwise hinder hydrogen bake-out, a situation that is surprisingly avoided by omitting the brighteners from the bath.

Conventional brighteners are materials that alter the structure of the plate deposit with respect to plate morphology through grain refinement. Their use reduces porosity of the plating and increases plating smoothness. Although such effects are desirable in conventional steels, it has now been determined that such is undesirable for HSLA steels. The invention is not limited by theory, but it appears that the noted grain refinement can lead to reduced hydrogen permeability, which in HSLA steels may lead to base material embrittlement.

Production of zinc/nickel coatings on high strength low alloy steels having suitable morphology and corrosion/embrittlement properties depends on the bath chemistry as described above and also on the steps used in preparation of the alloy for coating and the parameters of the electrodeposition process.

The zinc/nickel plating process is carried out in the pH, temperature, and current density ranges, suitable as described herein. When carried out with a preferred solution as outlined above and within the preferred operating ranges set forth herein, an alloy containing from 85 to 95 percent by weight zinc and 5 to 15 percent nickel is produced. When applied to HSLA alloys, this coating will provide excellent corrosion resistance as well as low hydrogen embrittlement. In a preferred embodiment, the coating consists of about 90 weight percent zinc and about 10 weight percent nickel. The goal is to combine maximum corrosion resistance and minimum hydrogen embrittlement.

The bath can effectively be operated in a basic pH range, preferably from about 12 to about 13.5. In one embodiment, the pH of the bath is adjusted as need be, while avoiding the introduction of undesirable ions into the solution. In other embodiments, the amount of hydroxide ion is controlled resulting in a basic pH throughout the plating process. The zinc/nickel alloy can be plated in accordance with the present invention over a wide variety of temperatures and current densities. The electrodeposition can occur over a broad temperature range of about 65° P. to about 85° P., preferably at room temperature from 70° P. to 80° F.

The cathode current densities preferably range from about 30 to about 68 amperes per square foot (ASP) or from 30 to 60 ASP to yield a satisfactory corrosion-resistant coating and also achieve low hydrogen embrittlement on HSLA steels. In general, these current duties are higher than those used in conventional bright plating, which are typically in the range of 10-30 ASF. In one aspect, avoidance of organic brighteners in the plating bath surprisingly permits the process to be carried out in a current density range not rechargeable with conventional plating.

At a current density that is too low on the order of 20 to 24 ASP, there is a tendency toward poor coverage of the substrate with the coating. At high current density, on the order of over 70 amperes per square foot, for example, the metal is deposited more rapidly and the coating tends to appear rough or relatively grainy, yielding unsatisfactory results.

The anode of the electroplating system is preferably nickel. The part being treated is the cathode. The resulting product has nickel distributed throughout the zinc coating. At the typical 36 amperes per square foot the deposition preferably occurs over a period of time of 15 to 30 minutes of plating depending on the thickness requirement. The 30 minute plating rate (PR) for this process is approximately 0.8 mil (thousand of an inch) at 30 ampere-per-square-foot (ASP), 1.5 mils at 45 ASP and 1.9 mils at 68 ASP, although plating rate can significantly vary depending on combined operating condition and parameters.

The zinc/nickel coatings of the invention are preferably applied to a thickness of 0.0005 to 0.0008 inch (0.5 to 0.8 mil) for aerospace applications. Plating time to achieve such coatings is dependent on the current density, temperature, and the composition of the bath.

The complexing agent (chelating agent) plays a role in giving sufficient nickel ion concentration and distribution, even at a low concentration. Thus, the complexing agent facilitates distributing the nickel co-precipitation with zinc in a uniform ratio. A complexing agent is therefore preferably included in the electroplating bath at a level to provide suitable complexing and bath stability. Suitable complexing agents include those that effectively complex nickel and that do not undergo reaction such as electrolysis under the plating conditions. It is believed that such lack of reaction contributes to the stability of the complexing agents and also to the lack of participation by the complexing agent in side reactions that would be deleterious to the formation of a coating with the desired dense and porous morphology that leads to the desirable combination of corrosion resistance and low hydrogen embrittlement performance.

If needed, suitable complexing agents can be identified by routine experimentation to determine whether a plating bath containing the complexing agents produces a coating on HSLA steel that provides both corrosion and embrittlement properties. If a proposed complexing agent interferes with such plating or coating, another can be used in its place. It has thus been discovered that suitable coating are produced on HSLA steels by careful avoidance of additives in the plating bath that are otherwise conventional in the zinc/nickel plating of other steel alloys.

One exemplary class of complexing agents is an organic amino compound, such as ethylenediamine (EDA), polyethylenepolyamines such as diethylene triamine (DETA), triethylenetetramine (TETA), N-hydroxyethylenediamine (HEEDA), etc., and alkanol amines such as diethanolamine (DEA), triethanolamine (TEA), N-methylethanolamine, 2-aminopropanol, and the like. In various embodiments, DETA or a combination of DETA and TEA are preferred. The complexing agent may include aminocarboxylic acids or salts such as nitrilotriacetate, ethylenediamine-tetraacetate, diethylenetriamine pentaacetate and so on. . . . It is understood that an aminocarboxylic acid complexing agent will be in a salt (deprotonated) form at the alkaline bath pH. Other complexing agents can be selected if their use does not produce unsuitable coatings, with regard to corrosion and hydrogen embrittlement properties.

The zinc/nickel plating baths contains less than 100 ppm of any organic material other than one that meets the requirements of a nickel complexing agent described herein. Preferably, there is less than 50 ppm of such organic material, or less than 10 ppm. In a preferred embodiment, the plating bath compositions contain essentially no organic material other than chemical species that complex and keep nickel ions in solution and do not undergo electrolysis reaction under the plating conditions. In various aspects, this means that conventional brightening agents are to a large extent avoided. A brightening agent is one that, if included, would lead to a coating characterized as "bright" by those of skill in the art. Bright coatings are desirable in some applications; however, in the current invention, the presence of brighteners and the resulting bright coatings on high strength low alloy steels has been found correlated with unacceptable corrosion and/or hydrogen embrittlement properties. Normally, the resulting zinc/nickel coatings of the invention are found to be matte in appearance, while possessing high corrosion resistance and low to hydrogen embrittlement.

Agitation of the bath during plating is preferably carried out mechanically. In various aspects, air agitation (e.g. bubbling and sparging) is avoided because of the sensitivity of the process to oxygen.

Plating is carried out preferably with an anode to cathode ratio of at least 2:1. With conventional bright coating lower ratios can be used. With the current method, larger anodes are used to provide good hydrogen embrittlement properties. Also, with the high current densities used in the present invention auxiliary anoding is important and is preferably used. Suitable auxiliary anodes include nickel, nickel plates, and platinized titanium anodes.

Prior to deposition of the zinc/nickel alloy, the article to be plated is preferably cleaned and activated for electrodeposition. The article to be plated is first manually solvent cleaned or vapor degreased in accordance with conventional procedures normally employed in the plating arts. After cleaning or degreasing, the article is dried and cleaned with an abrasive blast. Within a relatively short period of time after the abrasive cleaning, the article is rinsed in cold water for several minutes, activated by immersing it in an acid or other solution for a desired time, rinsed with cold water, transferred, immersed and plated electrolytically in the zinc/nickel plating bath as described herein.

A chromate treatment of the part can follow the hydrogen relief baking step. In some embodiments, the chromate treatment increases the corrosion protection for zinc/nickel plating and provides a good adherent base for paint. Conventional chromating and other optional post-treatment steps are utilized as desired. The example below includes a chromating step.

Chromate is applied from a known process, basically a dip/immersion process, a non-electrodeposition process. The chromate is delivered from various sources. Any chromate can be used and various chromate solutions can be used, for example, chromic acid with sulfuric acid; a dichromate and sulfuric acid, or dichromic acid with hydrochloric acid.

Conventional pre and post treatment methods are described in U.S. Pat. No. 4,765,871, assigned to Boeing and incorporated by reference herein in its entirety.

Figure 1:
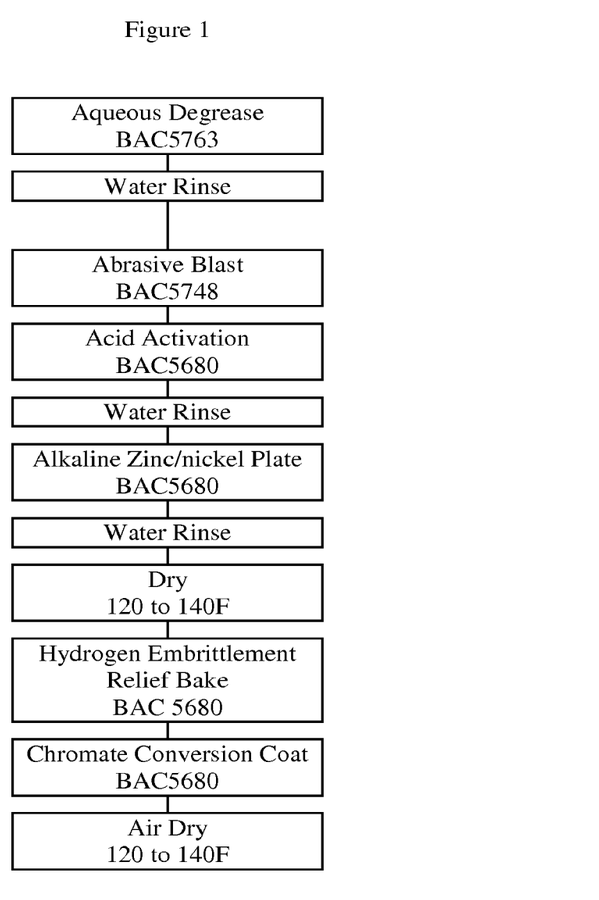
FIG. 1 is a process flow diagram.

An exemplary process is given in FIG. 1. It shows a preferred sequence of aqueous degreasing, abrasive blasting, acid activation, electroplating, and hydrogen embrittlement relief baking, along with an optional chromate conversion coating. Conventional procedures can be used for the various non-electroplating steps, as indicated in FIG. 1 by reference to aerospace industry standards.

In an exemplary embodiment, aqueous degreasing is carried out according to the procedure and parameters prescribed in Boeing specifications BAC 5408, BAC 5750, or BAC 5763, the full contents of which are incorporated by reference.

Abrasive blasting is preferably performed after the degreasing. An exemplary procedure is given in Boeing standard BAC 5748. In a preferred embodiment, abrasive blasting using a suitable grit (such as aluminum oxide) of 80 to 120 particle size (as defined in BAC 5748) is found to contribute significantly to the low embrittlement/re-embrittlement properties. Following grit blasting, acid activation of the substrate just prior to immersion into the plating bath tends to reduce oxide formation and results in strongly adhering plating deposits.

Alkaline zinc nickel plating is carried out using the bath composition and plating parameters described herein. Table 1 summarizes various preferred alloy ranges, bath compositions, and operating parameters set forth above. Concentrations are given in ounces per gallon. One ounce (28.35 g) per gallon (3.79 liters) is equivalent to about 7.5 grams per liter (7.5 g/L). Temperatures are given in degrees Fahrenheit (° F.). To convert to ° C., subtract 32 and multiply the remainder by 5/9.

TABLE 1

| Material/Condition | Range | Exemplary |
| --- | --- | --- |
| Alloy composition, as plated (weight %) | Zn 85 to 95<br>Ni 5 to 15 | |
| Zinc metal content (bath) | 1.17 to 1.45 oz/gal | 1.4 oz/gal |
| Nickel metal content (bath) | 0.12 to 0.15 oz/gal | 0.13 oz/gal |
| Zinc to Nickel weight Ratio (no units) (bath) | 10:1 to 11:1 | |
| Nickel complexing agent (bath) | Vary as needed | |
| Sodium Hydroxide (bath) | 17.4 to 21.2 oz/gal | 18 oz/gal |
| pH (bath) | 12.0 to 13.5<br>Typical values | 12.5 |
| Sodium Carbonate (bath) | Less than 8 oz/gal | |
| Agitation/Filtration (bath) | Mechanical (2 to 3 volume turnovers per hour)<br>5 to 10 micron filter | |
| Temperature (bath) | 65° F. to 85° F. | 70° F. to 80° F. |
| Anoding<br>Caution: do not use nicket balls in titanium containers (poor conductivity) | 1) Main (primary): Nickel slab, nickel plated<br>2) Auxiliary (secondary); Nickel, nickel plated, platinized titanium | |

TABLE 1-continued

| Material/Condition | Range | Exemplary |
| --- | --- | --- |
| Anode/Cathode Ratio | Minimum 2:1 | Maximize |
| Cathode Current Density | 30 to 60 Amperes per square foot | 45 Amperes per square foot |

If the Ni-complexing agent is omitted from the plating solution, but the other operational parameters of the present invention are maintained within ranges defined below, a zinc/nickel coating exhibiting good corrosion resistance and low hydrogen embrittlement is still achieved. The nickel distribution in the coating is not, however, as good as when the nickel complexing agent is present in the plating solution. In order to achieve this result, the plating bath composition is as per the Examples below. Brighteners are not included and preferably the only organic compound in the bath is the nickel complexing agent. Grain refiners can be included if they do not interfere with the deposition of a suitably porous coating.

In summary, several factors were found to be useful for achieving the low embrittlement and high corrosion resistance properties. These include:
Bath chemistry composition and concentration ranges
Plating parameters for temperature, current densities, and anode-to-cathode ratios
Process sequence
Structure/morphology of the plate deposit It should be noted that established low embrittlement plating processes such as Cadmium-Titanium plating or Acid Zinc/Nickel plating rely on additives to achieve the desired deposit morphology. The process described herein does not use such additives and relies solely on the control of process parameters as described herein and exemplified below to produce the desired structure. Additives such as are used with Cd—Ti or acid Zn/Ni plating would potentially build up over time and would therefore limit the bath life, unless removed automatically or through incorporation into the plate deposit. For example, in cadmium-titanium plating, where a titanium compound is co-deposited, the excess titanium product is kept within a filter system external to the actual plating bath. With zinc/nickel plating baths, such methodology is technically not feasible, and for that reason an additive-free bath chemistry, which achieves low embrittlement deposits, turns out to be advantageous.

The present invention is thus in various embodiments a more environmentally acceptable plating process for high strength low alloy steels that does not introduce hydrogen embrittlement problems, or at least minimizes such problems. The low hydrogen embrittlement zinc/nickel plating process of the invention is alkaline in nature and utilizes commercially available chemicals for plating bath preparation and replenishment. The deposited coating is primarily 85 to 95 percent zinc by weight and 5 to 15 percent nickel by weight, and will have a dull appearance, over a wide range of current density, an effective range of 30 to 68 ampere-per-square-foot. The engineering properties of this coating are low embrittlement, good corrosion resistance, excellent paint base and lubricity. This process can be used on steels heat-treated at 220 ksi tensile strength or higher, replacing low hydrogen embrittlement cadmium and low hydrogen embrittlement cadmium-titanium plating.

In preferred embodiments, the electroplating processes described herein result in a coating morphology that leads to both high corrosion resistance (indicating some resistance to allowing oxygen or water through the coating to the alloy surface) and low hydrogen embrittlement (indicating that the coating provides a path for hydrogen to escape from the substrate). The morphology is thus described as dense enough to prevent oxygen or water from reaching the surface, but porous enough to permit hydrogen absorbed into the substrate to escape during a low embrittlement bake subsequent to coating. Thus the morphology is characterized by a density that provides corrosion resistance and also by a porosity that provides low hydrogen embrittlement. This morphology, achieved here for the first time on a high strength low alloy steel, is also illustrated in the Figures. In various Figures, the density of the anti-corrosion coating can be appreciated, and channels for escape of hydrogen are clearly visible.

EXAMPLE I

An aqueous electroplating bath containing no brightener was prepared containing per gallon of solution, 1.17 to 1.45 ounces of zinc, 0.12 to 0.15 ounces of nickel, 17.4 to 21.2 ounces of sodium-hydroxide and a minor amount of Ni-complexing agent. The pH of the bath was 12 to 13.5 and was maintained at about room temperature of 70° F. to 80° F. Only nickel was employed as an anode. Test panels were prepared with current densities of about 30 to 68 ASF, and more specifically, deposition was conducted at 30 ASF, 36 ASF, 45 ASF and 68 ASF. At a current density of about 30 to 68 amperes per square foot, the zinc/nickel alloy deposit was well-coated on the high strength steel.

EXAMPLE II

An acceptable source of zinc metal is available from Atotech and sold under the trade names Reflectalloy and Reflectalloy ZNA. A zinc-metal solution having the designation ZNA ZS supplies zinc and caustic soda to the bath; and the zinc compound has CAS no. 12179-14-5 designation and is present at up to about 10 wt % in the ZNA ZS and the sodium hydroxide has CAS no. 1310-73-2 designation and is present in the ZNA ZS at up to about 30 wt %. Product designation ZNA-92 Ni—C supplies nickel to the bath; and the nickel sulfate has CAS no. 7786-81-4 designation and is present in the ZNA-92 Ni—C at up to about 40-70 wt %. Product designation ZNA-C9300 carrier is used along with the 92 Ni—C to facilitate delivery of nickel; and product ZNA-C9300 carrier is a mixture of diethylene triamine, CAS No. 111-40-0 designation, up to 30 wt % and tliethanolamine, CAS no. 102-71-6 designation, up to 10 wt % in the C9300 carrier. Product ZNA-C9400 carrier also adjusts the nickel delivery, and C9400 carrier has characteristics similar to the C9300 carrier. Further characteristics of each of the ZNA ZS, ZNA-92 Ni—C, the C9300 and the C9400 are included in the MSDS and Atotech product literature for each, incorporated herein by reference as a teaching tool. Thus, it can be seen that the plating solution essentially comprises a source of zinc, a source of nickel, a source of caustic soda and a source of complexing or chelating agents to facilitate the deposition of appropriate amounts of nickel with respect to zinc.

The solution in accordance with this present example contains the following quantities to provide 100 gallons of suitable electroplating solution using commercially available starting materials. Supply zinc and caustic soda to the bath via 35 gallons of Reflectalloy ZNA ZS. Supply nickel to the bath using 0.75 gallons Reflectalloy ZNA-92 Ni—C which is a nickel containing component that is used for the initial bath, and to replenish nickel in an operating bath; and it is used in cooperation with the ZNA-C9300 which is supplied in the amount of 4.5 gallons to adjust the amount and rate of nickel deposit and Reflectalloy ZNA-C9400 in an amount of 5.4 gallons to also adjust the rate of nickel deposit. In a typical protocol Rayon grade sodium hydroxide 50% in liquid form provides bath conductivity and assists in dissolution of the zinc. In a typical protocol, the steps are as follows: First fill the plating tank equipped with preferred chiller and agitator to 25 percent of its desired final volume. Second, while agitating, add the ZNA-C9300. Next, add the required amount of the Reflectalloy ZNA-92 Ni—C. Then the required amount of Rayon grade sodium hydroxide is added followed by the addition of the zinc solution. Next, stirring is continued while the required amount of the Reflectalloy ZNA-C9400 carrier is added. Sufficient water to bring the solution to its final desired volume and composition is added. Next, the solution is stirred and the nominal composition is within the ranges as shown in Table 1 and as described in this example with preferably the composition being near the mid-range of the values given in Table 1. Coating was conducted at 36 ASP, 45 ASP and 68 ASP.

The high strength steel specimens were tested by static tensile loading at 75 percent of established notch ultimate tensile strength (often referred to as the dry test). The specimens were loaded continuously for at least 200 hours. The specimens withstood the loading for more than 200 hours and exhibit satisfactory low hydrogen embrittlement characteristics. Best results occurred at 45 ASP, giving a good coating distribution, good resistance to corrosion and good resistance to hydrogen embrittlement. Specimens at 36 ASP and 68 ASP also showed good results in all categories, but the specimen at 68 ASP showed slight corrosion.

EXAMPLE 3

Using the process flow and plating parameters of the invention as outlined above, a zinc/nickel plated structure with low embrittlement properties is obtained while maintaining corrosion performance. When Zn/Ni baths containing conventional brighteners are used, even with the same process flow and plating parameters, a dense zinc/nickel plating structure is formed where hydrogen bake-out is retarded. The embrittlement performance can be correlated to the morphology of the corresponding plated, as demonstrated in FIGS. 2a and 2b.

Figure 2A:
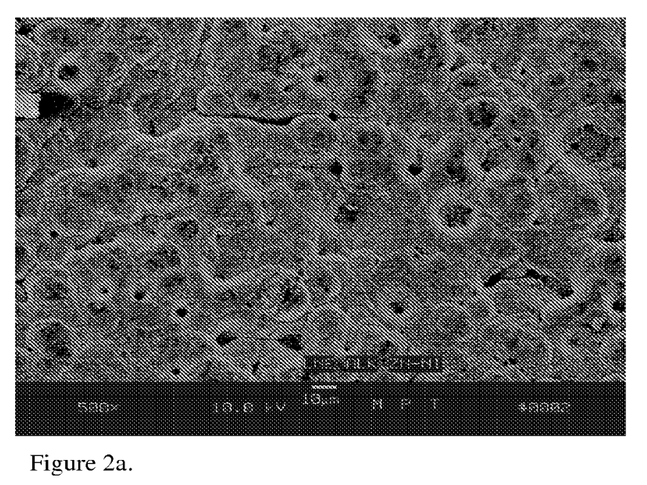
FIG. 2a is a low embrittlement alkaline Zn—Ni plate deposit of the invention at 500×, top surface.

The following information is applicable for the LHE Zn/Ni plating as illustrated in FIG. 2a. The substrate is AISI 4340M steel plate. The surface is degreased, blasted, acid activated and plated at 45 ASP for approximately 30 minutes to give a coating of approximately 0.8 mil (0.0008 inch):

1) LHE Zn—Ni Chemistry & Parameters g/L/7.488 = oz/gal

| Item | Contain | Provided by | Concentration of Tank g/L | Concentration of Tank oz/gal | Control range g/L | Control range oz/gal |
|---|---|---|---|---|---|---|
| 1 | Zn metal | ZNA ZS | 10.77 | 1.44 | 8.7-10.8 | 1.2-1.45 |
| 2 | NaOH | | 135.00 | 18.03 | 129.8-158.2 | 17.4-21.2 |
| 3 | Ni metal | ZNA-92 Ni—C | 1.06 | 0.14 | 0.9-1.12 | 0.12-0.145 |
| 4 | Zn:Ni ratio | | 10.20 | | 10:1-11:1 | |
| 5 | Carrier (Ni complexer) | ZNA-C9300 Carrier | ~4.5% by volume | | ~4.5% by volume | |
| 6 | Carrier (Grain refiner) | ZNA-C9400 Carrier | ~5.4% by volume | | ~5.4% by volume | |
| 7 | Brightener | ZNA-9500 | None | | None | |
| 8 | Brightener | ZNA-9700 | None | | None | |
| 9 | Sodium Bicarbonate | By product | 40.00 | 5.34 | <59.8 | <8 |
| 10 | Temperature | Heater/chiller | 70 F. | | 70-80 F. | |
| 11 | Current density | Rectifier | 45 ASF | | 30-65 ASF | |

Figure 2B:
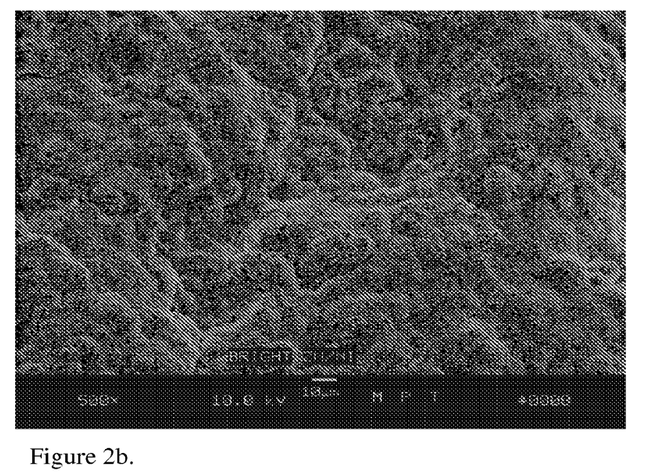
FIG. 2b shows a bright Zn—Ni plate deposit (hydrogen bake-out inhibited) at 500×, top surface.

The following information is applicable for the bright Zn/Ni plating as illustrated in FIG. 2b. The substrate is AISI 4130 annealed steel sheet. The substrate surface is degreased, blasted, alkaline cleaned, acid activated and plated at 25 ASP for approximately 30 minutes to give a coating of 0.5 mil (0.0005 inch):

2) Bright Zn—Ni Chemisty & Parameters g/L/7.488 = oz/gal

| Item | Contain | Provided by | Concentration of Tank g/L | Concentration of Tank oz/gal | Control range g/L | Control range oz/gal |
|---|---|---|---|---|---|---|
| 1 | Zn metal | ZNA ZS | 11.00 | 1.47 | 5.7-12.5 | 1.2-1.7 |
| 2 | NaOH | | 146.00 | 18.70 | 129.8-158.2 | 17.4-21.2 |
| 3 | Ni metal | ZNA-92 Ni—C | 1.10 | 0.15 | 0.9-1.13 | 0.12-0.17 |
| 4 | Zn:Ni ratio | | 10.00 | | 8:1-11:1 | |
| 5 | Carrier (Ni complexer) | ZNA-C9300 Carrier | ~4.5% by volume | | ~4.5% by volume | |
| 6 | Carrier (Grain refiner) | ZNA-C9400 Carrier | ~5.4% by volume | | ~5.4% by volume | |
| 7 | Brightener | ZNA-9500 | ~0.033% by volume | | ~0.033% by volume | |
| 8 | Brightener | ZNA-9700 | ~0.3% by volume | | ~0.3% by volume | |
| 9 | Sodium Bicarbonate | By product | 50.00 | 6.68 | <59.8 | <8 |
| 10 | Temperature | Heater/chiller | 70 F. | | 68-85 F. | |
| 11 | Current density | Rectifier | 20 ASF | | 15-30 ASF | |

Figure 3A:
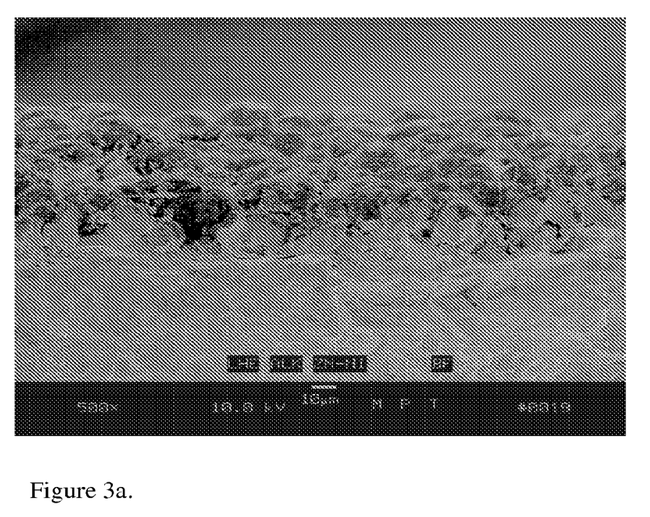
FIG. 3a shows the plate of FIG. 2a at a plate bend fracture at 500×.
Figure 3B:
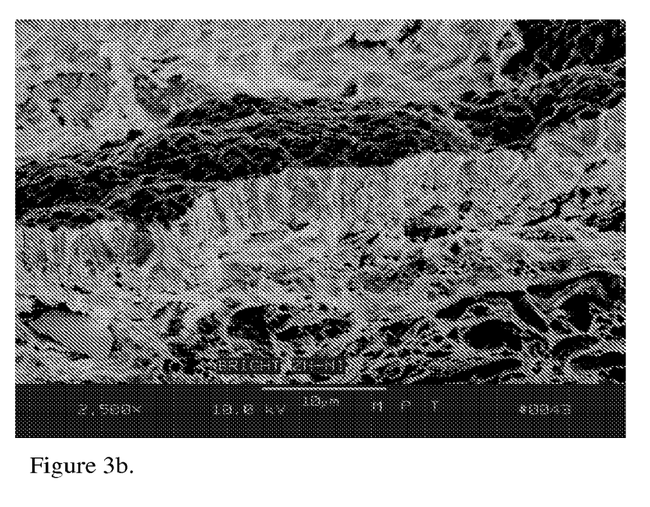
FIG. 3b shows the plate of FIG. 2b in a plate bend fracture at 2000×.
Figure 4A:
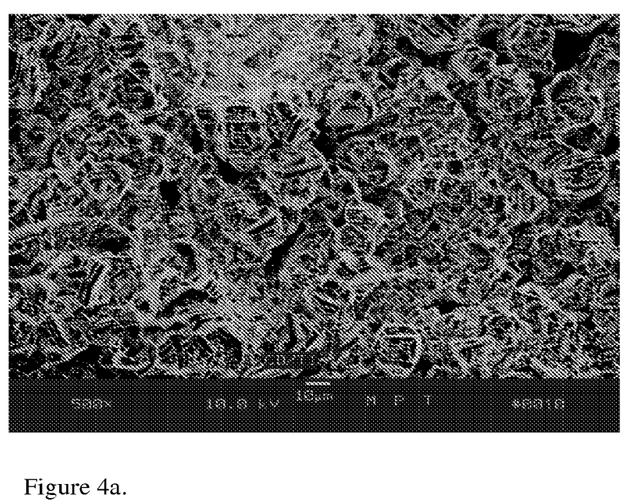
FIG. 4a shows a top view of standard low embrittlement Cadmium-Titanium plate at 500×, showing a coating on a HSLA steel.
Figure 4B:
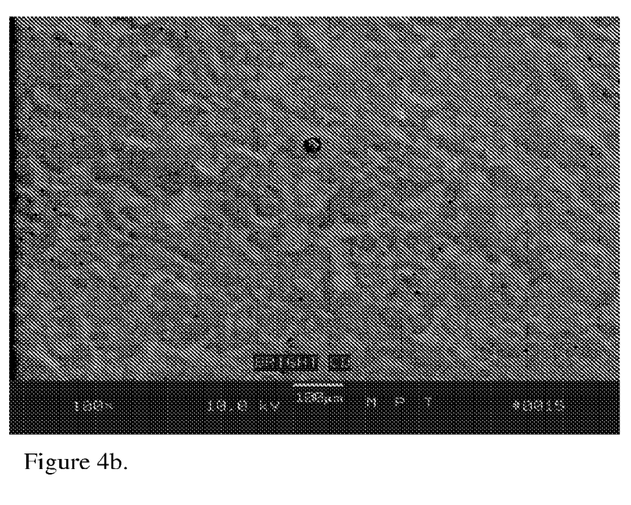
FIG. 4b shows a standard dense bright cadmium deposit at 500×.
Figure 5A:
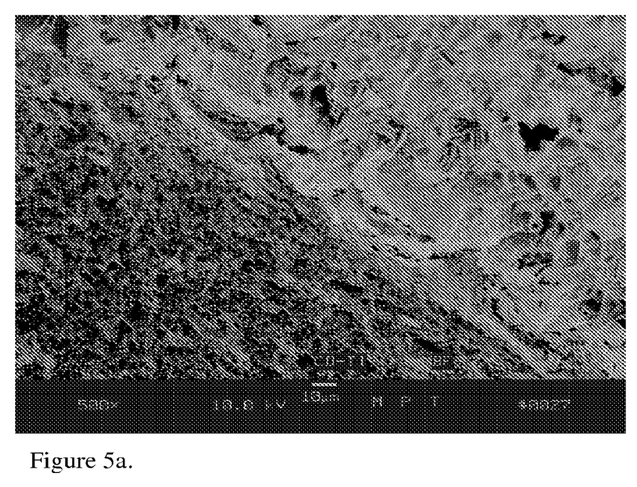
FIGS. 5a and 5b show the platings of 4a and 4b, respectively, in a plate bend fracture.
Figure 5B:
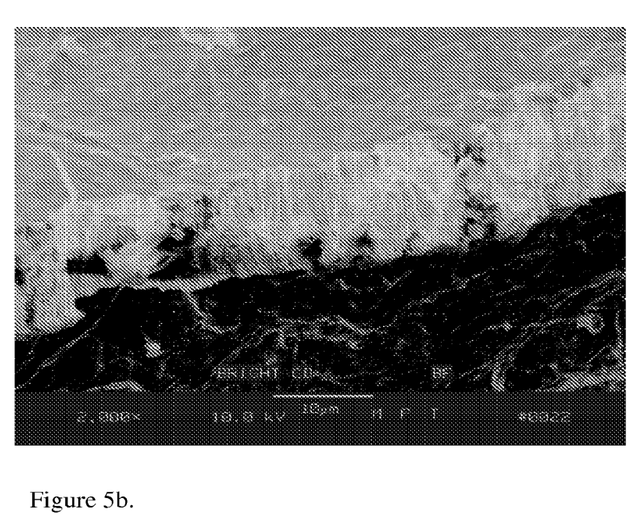

FIGS. 2a and 2b show the top surface of the plated substrate, while FIGS. 3a and 3b are fracture cross section views of the zinc/nickel plate deposit of FIGS. 2a and 2b respectively. FIGS. 4 through 5 are added for comparison purpose to show the conventional structures of Low Hydrogen Embrittlement Cadmium-Titanium Alloy plate and the bake-out retarded structure of bright cadmium plate. Those are the processes currently in use throughout the industry.

FIG. 2a shows a low embrittlement alkaline Zn—Ni plate deposit of the invention at 500×, top surface. The coating has a morphology characterized by a microporosity that permits entrapped hydrogen to migrate out of the plate.

FIG. 2b shows a bright Zn—Ni plate deposit (hydrogen bake-out inhibited) at 500×, top surface. This coating was produced with an electrodeposition bath that contained conventional brighteners. This dense deposit, also known as "bright" plating contains almost no micropores and will not permit hydrogen to migrate through.

FIG. 3a shows the plate of FIG. 2a at a plate bend fracture at 500×. Notice the nodular structure which permits hydrogen bake out.

FIG. 3b shows the plate of FIG. 2b in a plate bend fracture at 2000×. Notice the dense fracture layer (light band in center) which retards hydrogen bake out and leads to substrate embrittlement.

For comparison, FIG. 4a shows a top view of standard low embrittlement Cadmium-Titanium plate at 500×, showing a coating on a HSLA steel. Notice the typical crystalline porous microstructure of the deposit, which permits hydrogen bake-out. This porous morphology is successfully f01med in FIG. 2a using an alkaline Zn/Ni bath with no organics (other than the Ni complexing agent).

In Contrast, FIG. 4b shows a standard dense bright cadmium deposit at 500×. The deposit does not have low embrittlement properties, because of its dense structure. Note the similarity to the morphology in FIG. 2b, prepared with a conventional Zn/Ni bath.

Figure 6A:
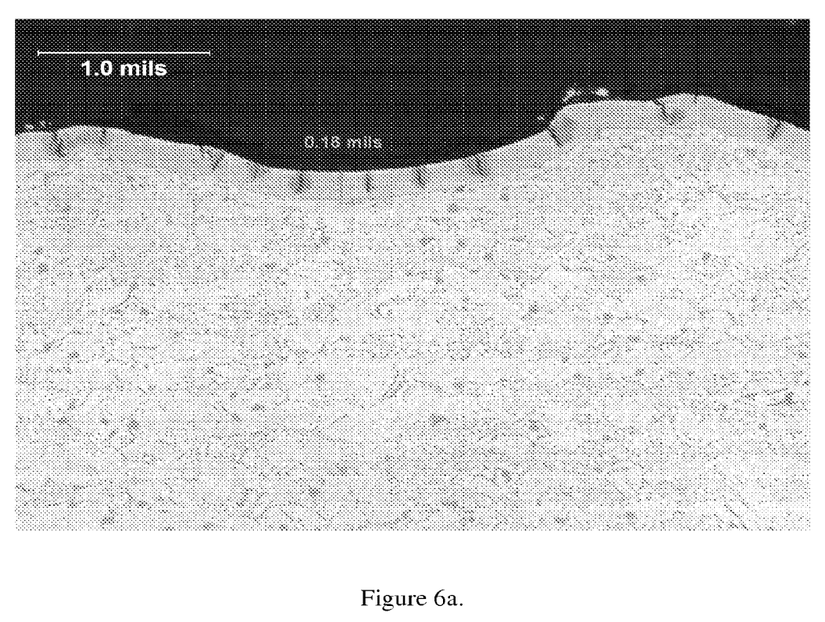
FIG. 6a shows a coating on an aluminum-nickel bronze steel rod.
Figure 6B:
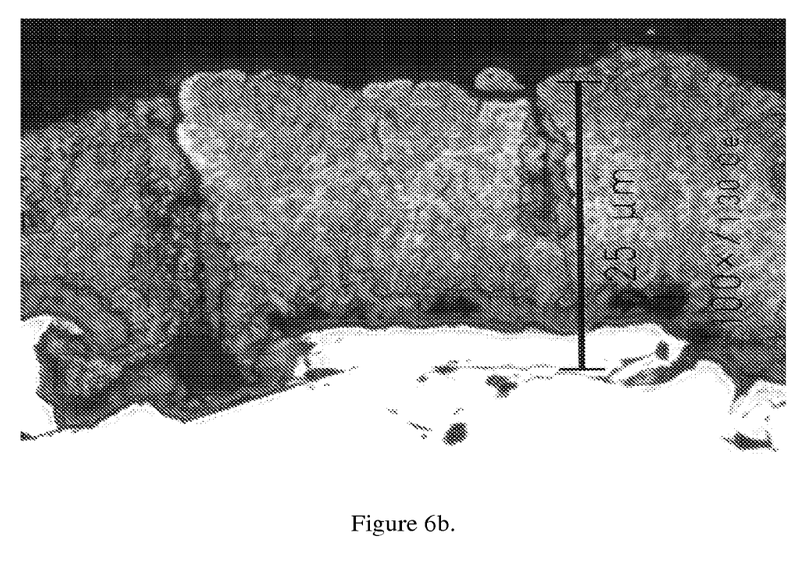
FIG. 6b shows a coating on 4340M steel.

FIGS. 5a and 5b show the platings of 4a and 4b, respectively, in a plate bend fracture. Note the similarity of the morphology of 5a to 3a, and 5b to 3b. In FIG. 6a, the substrate is aluminum-nickel bronze steel rod. The substrate surface is degreased, blasted, acid activated and plated at 25 ASF for 20 minutes to give a coating of 0.2 mil. In FIG. 6b, the substrate is 4340M steel and prepared and plated as follows: degreased, blasted, acid activated, and plated at 45 ASF for 35 minutes to give a coating of 0.8 mil. The coating is prepared in a manner very similar to that of FIG. 2a.

The chemistry and parameters used to obtain coating as illustrated in FIG. 6 is shown below (similar to what shown above. Because these specimens were plated from the same bath within a day of each other):

| | | | 1) LHE Zn—Ni Chemistry & Parameters g/L/7.488 = oz/gal | | | |
|---|---|---|---|---|---|---|
| | | | Concentration of Tank | | Control range | |
| Item | Contain | Provided by | g/L | oz/gal | g/L | oz/gal |
| 1 | Zn metal | ZNA ZS | 10.77 | 1.44 | 8.7-10.8 | 1.2-1.45 |
| 2 | NaOH | | 135.00 | 18.03 | 129.8-158.2 | 17.4-21.2 |
| 3 | Ni metal | ZNA-92 Ni—C | 1.06 | 0.14 | 0.9-1.12 | 0.12-0.145 |
| 4 | Zn:Ni ratio | | 10.20 | | 10:1-11:1 | |
| 5 | Carrier (Ni complexer) | ZNA-C9300 Carrier | ~4.5% by volume | | ~4.5% by volume | |
| 6 | Carrier (Grain refiner) | ZNA-C9400 Carrier | ~5.4% by volume | | ~5.4% by volume | |
| 7 | Brightener | ZNA-9500 | None | | None | |
| 8 | Brightener | ZNA-9700 | None | | None | |
| 9 | Sodium Bicarbonate | By product | 40.00 | 5.34 | <59.8 | <8 |
| 10 | Temperature | Heater/chiller | 70 F. | | 70-80 F. | |
| 11 | Current density | Rectifier | 45 ASF | | 30-65 ASF | |

In the Examples, brighteners ZNA-C9500 and ZNA-C9700 are commercial products of Atotech.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A zinc nickel plated article comprising a substrate and a zinc nickel alloy plating on the substrate, wherein the substrate is steel having a tensile strength of 200 ksi or higher, wherein the zinc nickel alloy plating is 85-95% by weight Zn and 5-15% by weight Ni, and wherein the article meets the corrosion specification requirements of ASTM B-117 and the low embrittlement specification requirements of ASTM F-519, Type 1 a.2, wherein the zinc nickel alloy plating is characterized by a morphology having micropores with diameters from about 5 μm to about 20 um.

2. The plated article according to claim 1, wherein the substrate is 4340M steel alloy.

3. The plated article according to claim 1, wherein the article is a part of a commercial aircraft component.

4. The plated article according to claim 1, wherein the zinc nickel plated article is made by a process comprising electroplating the zinc nickel plating on the substrate from an alkaline plating bath, wherein the weight ratio of Zn to Ni in the alkaline plating bath is 10:1 to 11:1.

5. The plated article according to claim 1, wherein the steel is characterized by a tensile strength of 220 ksi or higher.

6. The plated article according to claim 1, wherein the steel is characterized by a level of alloying of Cr and Ni below 10%.

7. A zinc nickel plated article comprising a substrate and a zinc nickel alloy plating on the substrate, wherein the zinc nickel alloy plating is characterized by a morphology having micropores with diameters from about 5 μm to about 20 um.

8. The plated article according to claim 7, which meets corrosion specification requirements of ASTM B-117 and the low embrittlement specification requirements of ASTM F-519, Type 1a.2.

9. The plated article according to claim 7, wherein the zinc nickel plated article is made by a process comprising electroplating the zinc nickel alloy plating on the substrate from an alkaline plating bath, wherein the alkaline plating bath has a weight ratio of Zn:Ni in the range of 10:1 to 11:1.

10. The plated article according to claim 7, wherein the substrate is a steel having a tensile strength of 200 ksi or higher and a level of alloying of Cr and Ni below 20%.

11. The plated article according to claim 7, wherein the morphology has a plurality of nodular structures having widths from about 2 μm to about 30 μm.

12. An aircraft component comprising a zinc nickel plated article, wherein the plated article comprises a steel substrate with and a zinc nickel plating on the substrate, wherein the substrate is characterized by a tensile strength of 200 ksi or higher and the zinc nickel plating is 85-95% by weight Zn and 5-15% by weight Ni, and wherein the plated article meets the corrosion specification requirements of ASTM B-117 and the low embrittlement specification requirements of ASTM F-519, Type 1a.2, wherein the zinc nickel plating is characterized by a morphology having micropores with diameters from about 5 μm to about 20 um.

13. The aircraft component according to claim 12, wherein the micropores of the zinc nickel plating are configured to permit entrapped hydrogen to migrate out of the zinc nickel plating.

14. The aircraft component according to claim 12, wherein the zinc nickel plating comprises zinc and nickel in a weight ratio of from 10:1 to 11:1.

15. The aircraft component according to claim 12, wherein the substrate has a tensile strength of 220 ksi or higher.

16. The aircraft component of claim 12, wherein the morphology has a plurality of nodular structures having widths from about 2 μm to about 30 μm.

17. The aircraft component according to claim 12, made by a process comprising electroplating the zinc nickel plating on the steel from an alkaline plating bath wherein the bath comprises zinc and nickel at a level to produce a plated coating containing 85-95% by weight zinc and 5-15% by weight nickel, wherein the bath comprises an effective amount of a nickel complexing agent;
   wherein the bath comprises less than 10 ppm of total organic material other than the complexing agent.

18. The aircraft component according to claim 17, wherein the bath comprises a nickel complexing agent selected from diethylene triamine or a combination of diethylene triamine and triethanolamine.

19. The aircraft component according to claim 17, wherein the bath comprises a nickel complexing agent selected from ethylenediamine (EDA), diethylene triamine (DETA), triethylenetetramine (TETA), N-hydroxyethylenediamine (HEEDA), diethanolamine (DEA), triethanolamine (TEA), N-methylethanolamine, 2-aminopropanol, nitrilotriacetate, ethylenediamine-tetraacetate, and diethylenetriamine pentaacetate.

20. The aircraft component according to claim 17, wherein the bath comprises less than 1 ppm of total organic material other than the complexing agent.

21. The aircraft component according to claim 17, wherein the electroplating is carried out at a cathode current density of 30-60 amperes per square foot and a bath temperature of 65° F. to 85° F.

* * * * *

UNITED STATES PATENT AND TRADEMARK OFFICE
CERTIFICATE OF CORRECTION

PATENT NO. : 10,704,155 B2
APPLICATION NO. : 15/424392
DATED : July 7, 2020
INVENTOR(S) : Luong M. Tran et al.

It is certified that error appears in the above-identified patent and that said Letters Patent is hereby corrected as shown below:

In the Claims

In Column 15, Line 44, in Claim 1, delete "um." and insert -- µm. --.

In Column 15, Line 65, in Claim 7, delete "um." and insert -- µm. --.

In Column 16, Line 37, in Claim 12, delete "and a" and insert -- a --.

In Column 16, Line 45, in Claim 12, delete "um." and insert -- µm. --.

In Column 16, Line 56, in Claim 16, delete "of" and insert -- according to --.

Signed and Sealed this
Twenty-fourth Day of January, 2023

Katherine Kelly Vidal
*Director of the United States Patent and Trademark Office*